(12) United States Patent
Pawar et al.

(10) Patent No.: US 9,548,770 B1
(45) Date of Patent: Jan. 17, 2017

(54) REDUCING INTER-SECTOR INTERFERENCE IN BEAMFORMING

(71) Applicant: Sprint Communications Company L.P., Overland Park, KS (US)

(72) Inventors: Hemanth Balaji Pawar, Brambleton, VA (US); Krishna Datt Sitaram, Chantilly, VA (US); Daniel Alberto Vivanco, Sterling, VA (US); Chunmei Liu, Great Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 118 days.

(21) Appl. No.: 14/536,284

(22) Filed: Nov. 7, 2014

(51) Int. Cl.
*H04Q 7/00* (2006.01)
*H04B 1/04* (2006.01)
*H04B 7/06* (2006.01)
*H04W 72/08* (2009.01)

(52) U.S. Cl.
CPC .......... *H04B 1/0475* (2013.01); *H04B 7/0617* (2013.01); *H04W 72/082* (2013.01)

(58) Field of Classification Search
None
See application file for complete search history.

(56) References Cited

U.S. PATENT DOCUMENTS

| | | | | |
|---|---|---|---|---|
| 2005/0265275 | A1* | 12/2005 | Howard | H04B 7/0417 370/328 |
| 2010/0167717 | A1* | 7/2010 | Hafeez | H04W 16/02 455/422.1 |
| 2014/0086071 | A1* | 3/2014 | Hu | H04J 3/14 370/252 |
| 2015/0189520 | A1* | 7/2015 | Lee | H04B 7/0871 370/252 |

* cited by examiner

*Primary Examiner* — Duc C Ho

(57) ABSTRACT

A method includes communicating to a plurality of user equipment (UE) in a cell using beamforming. The plurality of UE includes a first group of UE in a first sector of the cell and a second group of UE in a second sector of the cell. The method further includes monitoring positions of the plurality of UE in the cell. In addition, the method includes determining that at least one UE of the first group of UE is in a first region of the first sector, which indicates that a beamform corresponding to the at least one UE has a potential of interfering with one or more other beamforms corresponding to the second group of UE. Based on the at least one UE being in the first region of the first sector, beamforming is disabled to the at least one UE.

20 Claims, 6 Drawing Sheets

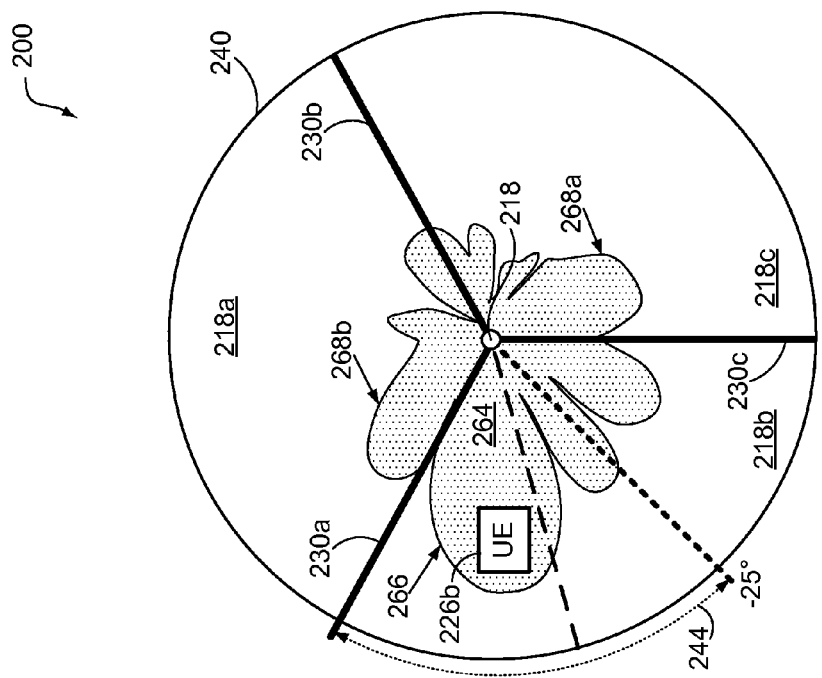
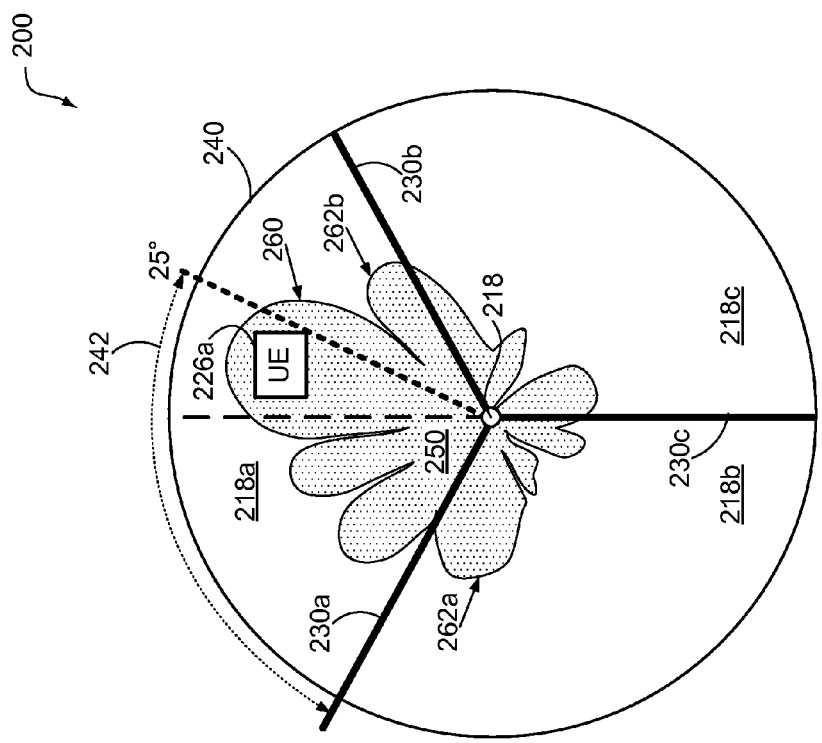
FIG. 2C
FIG. 2D

REDUCING INTER-SECTOR INTERFERENCE IN BEAMFORMING

SUMMARY

The present disclosure is directed, in part, to reducing inter-sector interference in beamforming, substantially as shown in and/or described in connection with at least one of the figures, and as set forth more completely in the claims.

In certain respects, beamforming is utilized by a base station to communicate with user equipment (UE) in a cell of one or more wireless networks. When UE are at certain positions in the cell, beamforms to those UE are prone to interfering with one another, thereby degrading beamforming performance for at least one of the UE. In accordance various implementations, positions of UE are monitored and beamforming may be disabled to one or more of the UE based on their monitored positions relative to one another to reduce or prevent interference between beamforms. In some cases, one or more UE may be selected to have beamforming disabled based on priorities of the UE, which can encompass various attributes of the UE.

In further respects, the present disclosure provides for disabling beamforming to at least one UE to reduce or prevent interference between beamforms to UE in different sectors, or inter-sector interference in beamforming. The at least one UE may have beamforming disabled based on being in a defined region of one sector while at least another UE is in a defined region of another sector. In some cases, beamforming is disabled for each UE in the defined region of the one sector. The regions may be defined such that inter-sector interference in beamforming often occurs when beamforming to UE in each of these defined regions. Furthermore, in some instances, the defined regions in each sector may be adjacent to a shared border between the sectors. In some implementations, pairs of such defined regions are adjacent to each shared border between sectors.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 2C illustrates a top view of a beamform in an exemplary network environment in which implementations of the present disclosure may be employed;

FIG. 2D illustrates a top view of a beamform in an exemplary network environment in which implementations of the present disclosure may be employed;

DETAILED DESCRIPTION

Figure 1:
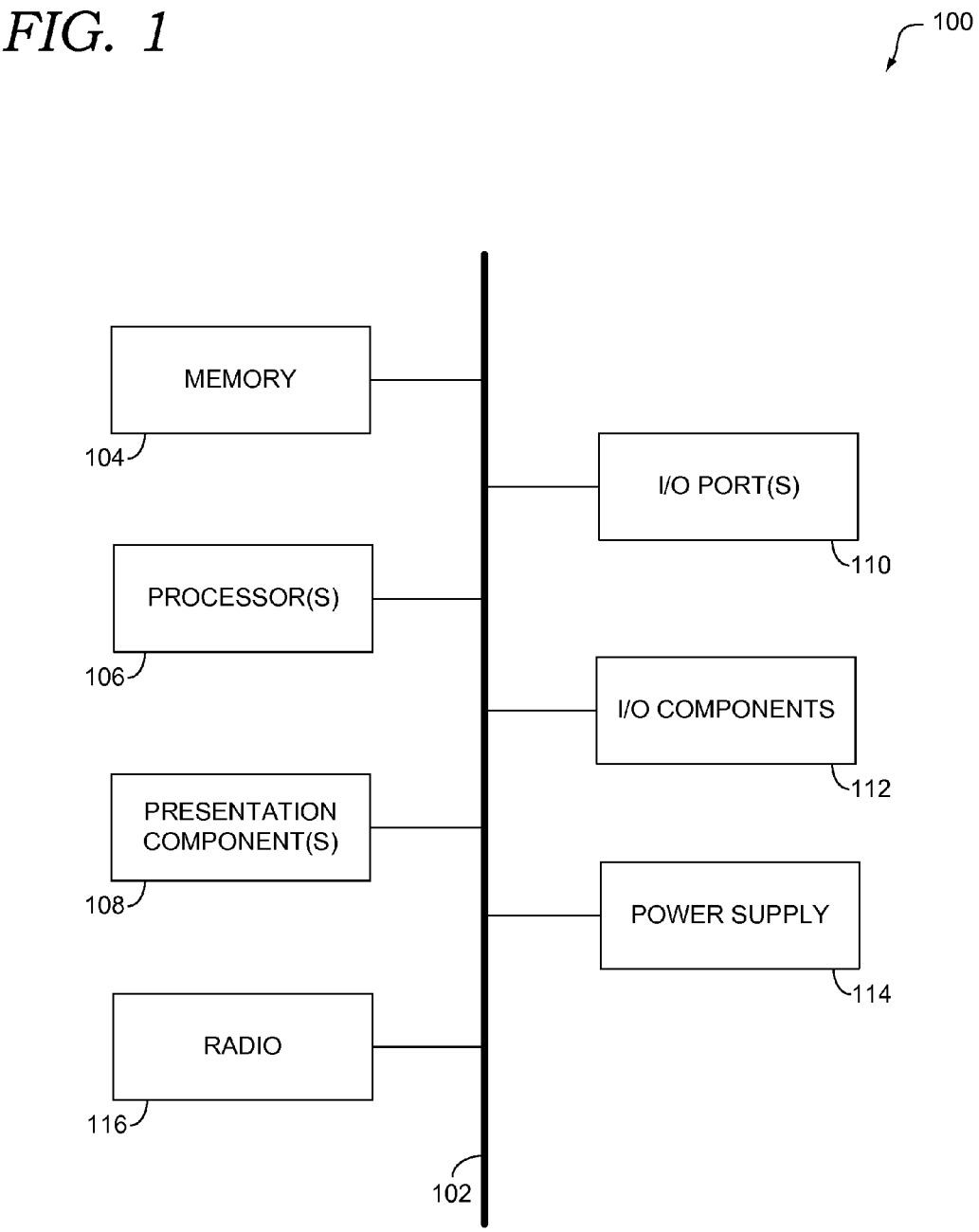
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain respects, beamforming is utilized by a base station to communicate with user equipment (UE) in a cell of one or more wireless networks. When UE are at certain positions in the cell, beamforms to those UE can interfere with one another, thereby degrading beamforming performance for at least one of the UE. For example, when UE are in certain positions relative to one another, a beamform to one of the UE may overlap with, or intersect, a beamform to another of the UE. The intersecting beamforms may interfere with one another, particularly, where the beamforms comprise the same frequencies. In accordance with various implementations, positions of UE are monitored and beamforming may be disabled to one or more of the UE based on their monitored positions. In this way, a base station may refrain from providing a beamform to a UE that may otherwise interfere with another beamform to another UE. Where beamforming is disabled for a UE in a cell, a base station of the cell may continue to communicate with the UE without beamforming, for example, utilizing a directional antenna.

Cells can comprise a plurality of sectors, any of which can include one or more UE. In many wireless communication networks, interference between beamforms to UE located in the same sector is minimal. In contrast, interference between beamforms to UE in different sectors can be significant. For example, in many systems a base station can select amongst various frequencies for beamforms in the same sector as well as schedule timing for the beamforms, such that the beamforms do not significantly interfere with one another. However, at least some frequencies are often reused between sectors, such that intersecting beamforms from different sectors are more likely to interfere with one another. This inter-sector interference is especially prevalent in cells where beamforming is separately scheduled for each sector.

In some respects, the present disclosure provides for disabling beamforming to at least one UE to reduce or eliminate interference between beamforms to UE in different sectors, or inter-sector interference. For example, when UE in different sectors are at relative positions in a cell where their beamforms would likely interfere with one another, beamforming may be disabled for at least one of the UE in one sector while beamforming is not disabled for one or more others of the UE in another sector. This can prevent the disabled beamform(s) from interfering with enabled beamform(s), thereby reducing or eliminating inter-sector interference in beamforming.

In some implementations, beamforming to one or more UE may be disabled based on monitored positions of UE indicating that one or more of the UE are located in a defined region of one sector of a cell while one or more of the UE are located in a defined region of another sector of the cell. Beamforming may be disabled for each UE in the defined region of the one sector. In some cases, the regions may be defined such that providing beamforms to UE in each of the regions often results in the beamforms at least partially overlapping. Furthermore, in some instances, the defined regions in each sector may be adjacent to a shared border between the sectors. In some implementations, pairs of such defined regions are adjacent to each shared border between sectors.

In some cases, selecting one or more UE to disable beamforming to is based on priorities of the UE. For example, one or more UE may be disabled based on collectively having a lower priority than one or more other UE. In turn, one or more UE may not be disabled based on collectively having a higher priority than one or more other UE. The UE being considered for the selecting may be based on the monitored positions of the UE relative to one another. For example, the UE may be at least some of those that are in the aforementioned defined regions of the sectors. Furthermore, in some cases, with respect to each pair of defined regions, either one or more UE in one of the defined regions is selected or one or more UE in the other of the defined regions is selected As priorities of UE may change over time, changes to which UE are enabled or disabled can occur based on their priorities. Priorities of UE may be based on any of various factors, including any combination of quality of service information and service flow information.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| CDMA | Code Division Multiple Access |
| WCDMA | Wideband Code Division Multiple Access |
| HSDPA | High-Speed Downlink Packet Access |
| CD-ROM | Compact Disk Read Only Memory |
| EEPROM | Electrically Erasable Programmable Read Only Memory |
| ENODEB | Evolved Node B |
| GPRS | General Packet Radio Service |
| GPS | Global Positioning System |
| GSM | Global System for Mobile Communications |
| LTE | Long Term Evolution |
| PC | Personal Computer |
| PDA | Personal Digital Assistant |
| RAM | Random Access Memory |
| RF | Radio Frequency |
| ROM | Read Only Memory |
| TDMA | Time Division Multiple Access |
| UMTS | Universal Mobile Telecommunications Systems |
| VOID | Voice over IP |
| Wi-Fi | Wireless Fidelity |

-continued

| | |
|---|---|
| WiMAX | Worldwide Interoperability for Microwave Access |
| UE | User Equipment |
| QoS | Quality of Service |
| QCI | QoS Class of Identifier |
| SRS | Sounding Reference Signal |
| SDF | Service Data Flow |

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2A:
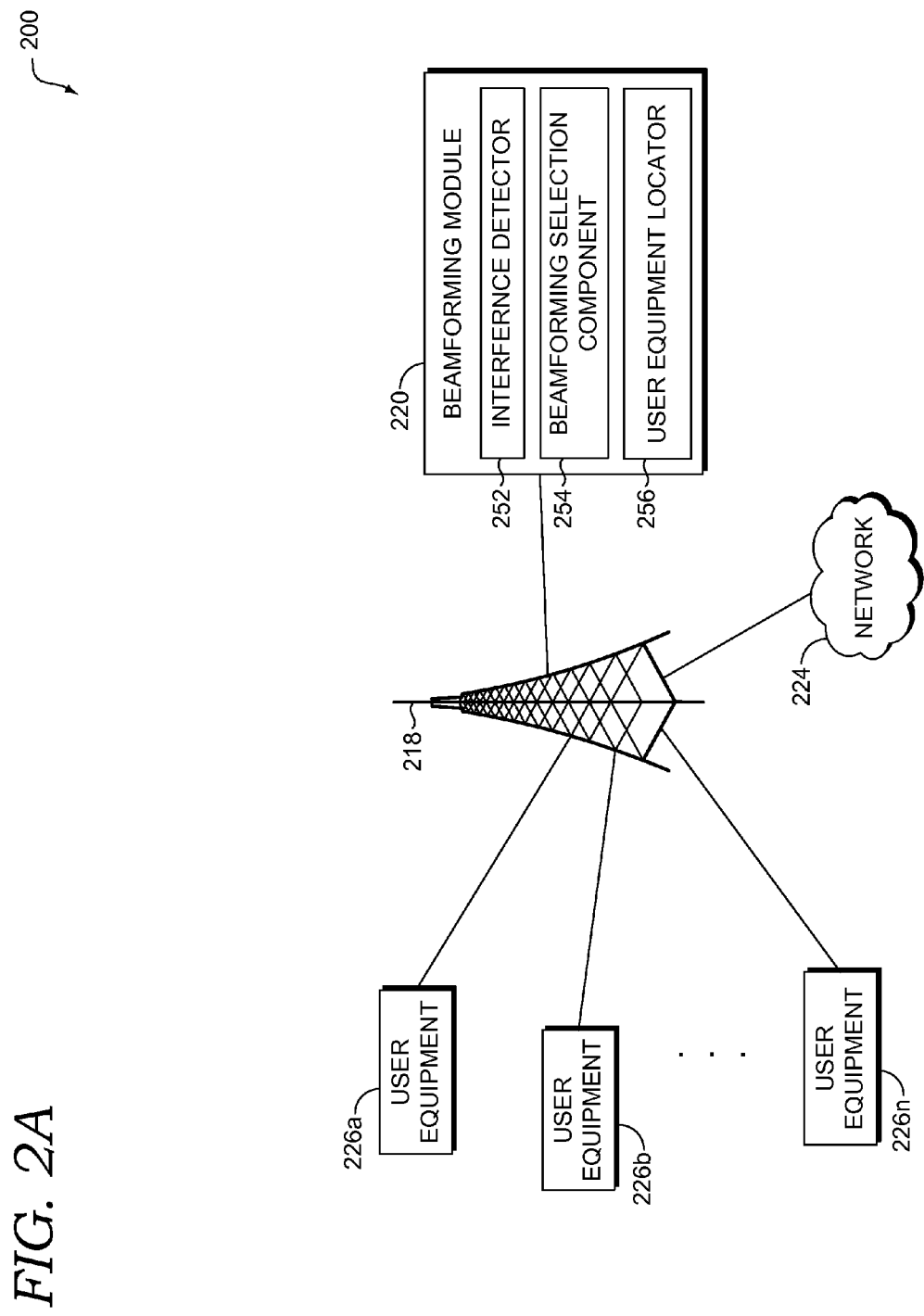
FIG. 2A illustrates a diagram of an exemplary network environment in which implementations of the present disclosure may be employed.

FIG. 2A provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes base station 218, beamforming module 220, network 224, and UE 226a and 226b through 226n. In network environment 200, UE, such as UE 226a and 226b through 226n may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

In some respects, the UE can correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, a UE comprises a wireless or mobile device with which a wireless telecommunication network(s) can be utilized for communication (e.g., voice and/or data communication). In this regard, the UE can be any mobile computing device that communicates by way of a wireless network, for example, a 3G or 4G network.

In some cases, the UE in network environment 200 can optionally utilize network 224 to communicate with other computing devices (e.g., a mobile device(s), a server(s), a personal computer(s), etc.) through base station 218. The network may be a telecommunications network(s), or a portion thereof. A telecommunications network might include an array of devices or components (e.g., one or more base stations), some of which are not shown. Those devices or components may form network environments similar to what is shown in FIG. 2A, and may also perform methods in accordance with the present disclosure. Components such as terminals, links, and nodes (as well as other components) can provide connectivity in various implementations. Network 224 can include multiple networks, as well as being a network of networks, but is shown in more simple form so as to not obscure other aspects of the present disclosure.

Network 224 can be part of a telecommunication network that connects subscribers to their immediate service provider. In some instances, network 224 can be associated with a telecommunications provider that provides services (e.g., LTE) to UE, such as UE 226a and 226b through 226n. For example, network 224 may provide voice services to UE or corresponding users that are registered or subscribed to utilize the services provided by a telecommunications provider. Network 224 can comprise any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

In some implementations, base station 218, which may also be referred to as a cell site, is configured to communicate with UE, such as UE 226a and 226b through 226n that are located within the geographical area, or cell, covered by radio antennas of base station 218. In particular, base station 218 may selectively communicate with the UE using beamforming. In doing so, there is a risk that beamforms to different UE can interfere with one another, which can significantly degrade wireless performance. In this regard, network environment 200 includes beamforming module 220, which can reduce or eliminate such interference between the beamforms.

As shown, base station 218 is associated with beamforming module 220, which comprises various components that are utilized, in various implementations, to perform one or more methods for reducing interference between beamforms (e.g. inter-sector interference) in one or more wireless communications networks. In some implementations, beamforming module 220 comprises components of base station 218. However, in other implementations, at least one component of beamforming module 220 is separate from base station 218.

Beamforming module 220 comprises interference detector 252, beamforming selection component 254, and UE locator 256. Interference detector 252 is configured to identify UE as candidates for having beamforming to the UE disabled so as to reduce or eliminate interference that may occur in beamforming to the UE. For example, the UE may be identified as candidates based on relative positions of the UE in a cell with respect to one another. In particular, UE may be identified as candidates where monitored positions of UE indicate that the UE are in locations prone to interference between beamforms. The positions of the UE can be determined utilizing UE locator 256 and can be provided to beamforming interference detector 252 for monitoring and selection/identification of the UE. Beamforming selection component 254 is configured to select to disable beamforming to at least one of the UE identified by interference detector 252.

Figure 2B:
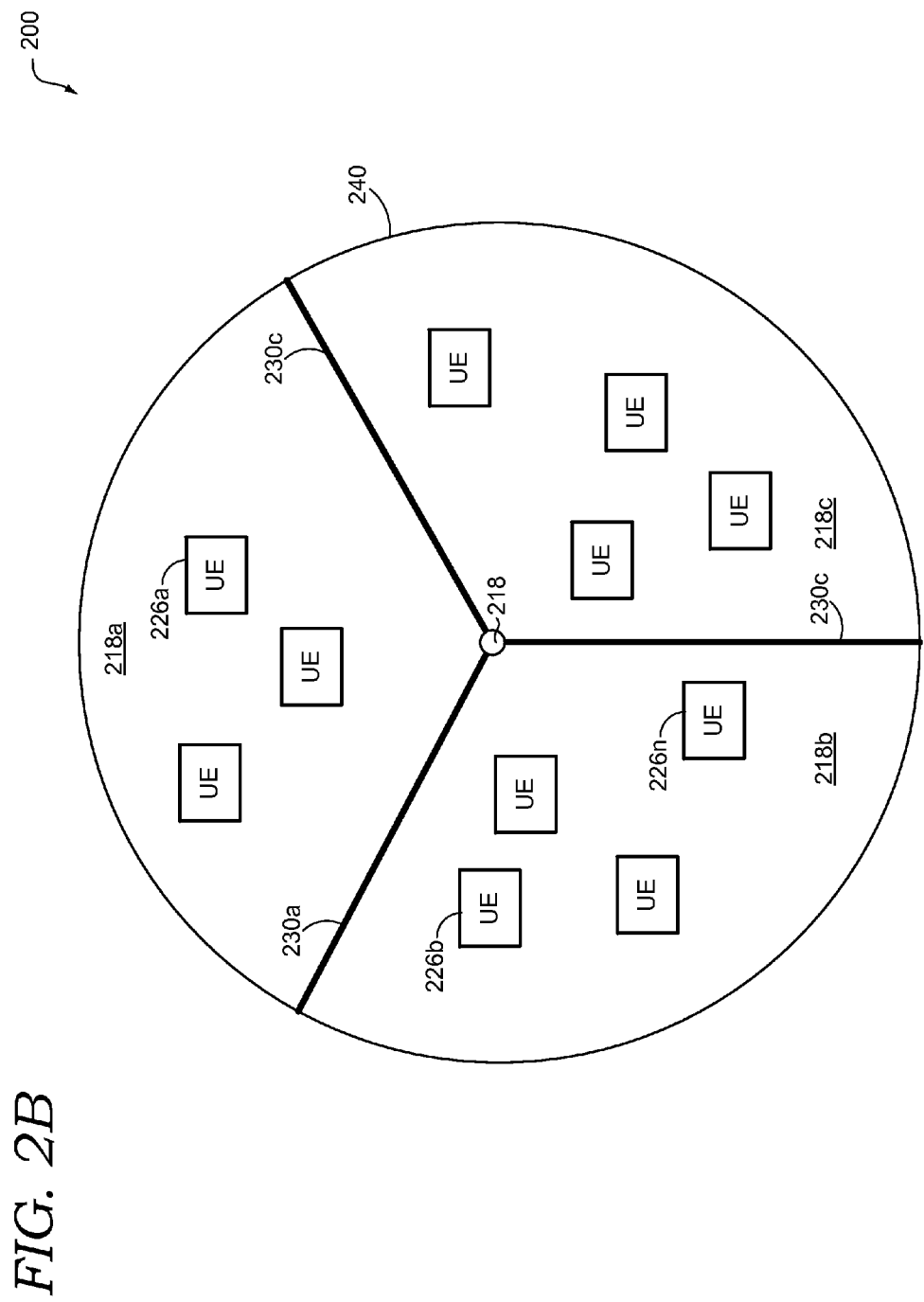
FIG. 2B illustrates a top view of an exemplary network environment in which implementations of the present disclosure may be employed.

In some implementations, beamforming module 220 is configured to reduce or eliminate inter-sector interference in beamforming for a cell that includes multiple sectors, such as cell 240 in FIG. 2B. Referring to FIG. 2A with FIG. 2B, FIG. 2B shows an exemplary cell in which implementations of the present disclosure may be employed. In particular FIG. 2B shows cell 240 comprising a plurality of UE, including UE 226a and UE 226b through UE 226n.

Base station 218 may comprise an eNodeB of an LTE network, by way of example, and is configured to communicate with any number of UE that may be in cell 240. Orthogonal frequency-division multiple access based systems, such as LTE, are especially prone to inter-sector interference as they are commonly deployed with a frequency reuse factor of 1, As shown, cell 240 is divided into a plurality of sectors, shown as sectors 218a, 218b, and 218c. Sectors 218a, 218b, and 218c are defined by borders 230a, 230b, and 230c. In the example shown, adjoining, or neighboring, ones of sectors 218a, 218b, and 218c have shared boundaries. Although cell 240 has three sectors in the present example, more or fewer sectors can be included in a cell in accordance with implementations of the present disclosure.

In cell 240, base station 218 can communicate with UE using beamforming. For example, in the present implementation, adaptive beamforming can be employed to communicate with at least some of the UE. Base station 218 may also optionally communicate with any of the various UE without beamforming, for example, when beamforming to the UE is disabled by beamforming module 220, and/or based on other considerations such as the distance of the UE from base station 218. As an example, a directional antenna of base station 218 could be employed to communicate with a UE without beamforming.

In some implementations, interference detector 252 is configured to monitor positions of UE in cell 240. For example, interference detector 252 may monitor positions of each of the UE shown in cell 240. The positions of the UE may be determined periodically by UE locator 256 and provided to interference detector 252 for monitoring. Interference detector 252 may then identify at least some of the UE as candidates for having beamforming to the UE disabled based on the monitored positions.

In some implementations, UE respectively report corresponding positions to UE locator 256. For example, at least some of the UE may include a GPS or other location detecting means to determine location data that corresponds to a location of the UE. The UE may provide the location data, which may comprise one or more GPS coordinates, or coordinates derived therefrom, to UE locator 256.

In various implementations, positions of UE are determined from radio frequency (RF) communications between base station 218 and UE. For example, a suitable RF communication employed to determine the position of a UE is a sounding reference signal (SRS) from the UE. In some cases, base station 218 allocates resources for a SRS from a UE. The UE sends the SRS to base station 218, and base station 218 and/or UE locator 256 process the received SRS to determine the position of the UE. The SRS may be received by multiple antennas of base station 218 in order to determine the position of the UE.

Determining positions of UE can comprise determining a Direction of Arrival (DoA) of an RF communication from a UE. Suitable algorithms for determining DOA include MUltiple SIgnal Classification (MUSIC) and Estimation of Signal Parameter via Rotational Invariance Technique (ESPIRIT). Although DoA is contemplated as being suitable, in some implementations, Direction of Departure (DoD) can be employed either to or from a UE.

Positions of UE can be represented utilizing one or more geographic coordinates of a geographic coordinate system, including Cartesian and/or polar coordinates. In some cases, the positions of UE that are monitored comprise at least angles of the UE with respect to a reference substantially at the center of the cell, such as the base station. Interference detector 252 may identify one or more UE as candidates for having beamforming disabled based on positions of the UE with respect to one another. In particular, UE may be identified as candidates where monitored positions of UE indicate that the UE are in relative positions prone to interference between beamforms.

In some instances, these positions may correspond to defined regions of the cell. In particular one or more pairs of regions may be defined such that, when at least one UE is in a first region of a first sector and at least another UE is in a second region of a second sector, beamforms to the UE are likely to interfere with one another. Thus, at least one UE may have its beamforming disabled based on being in a defined region of one sector while at least another UE is in a defined region of another sector to reduce or eliminate inter-sector interference in beamforming. The regions may be defined such that inter-sector interference in beamforming often occurs when beamforming to UE in each of these defined regions. In some implementations, in a pair of defined regions a defined regions in each sector may be adjacent to a shared border between the sectors. Examples of a suitable pair of regions is shown and described with respect to FIGS. 2C and 2D.

FIGS. 2C and 2D show exemplary regions of cell 240 in accordance with implementations of the present disclosure. In particular FIGS. 2C and 2D show regions 242 and 244 of cell 240. FIGS. 2C and 2D are similar to FIG. 2B. In this regard, cell 240 in each of FIGS. 2C and 2D may include the UE shown in FIG. 2B. However, of the UE in FIG. 2B, FIG. 2C only shows UE 226a and FIG. 2D only shows UE 226b, so as to more clearly illustrate certain aspects of the present disclosure.

In FIGS. 2C and 2D, regions 242 and 244 of cell 240 are defined as a pair of regions such that beamforming to a UE in region 242 while beamforming to a UE in region 244 will often result in inter-sector interference between beamforms. To illustrate the forgoing, in FIG. 2C, base station 218 is transmitting beamform 250 to UE 226a in sector 218a. Beamform 250 comprises main lobe 260 and a plurality of side lobes, of which side lobes 262a and 262b are individually labeled. In FIG. 2D, base station 218 is transmitting beamform 264 to UE 226b in sector 218b. Beamform 264 comprises main lobe 266 and a plurality of side lobes, of which side lobes 268a and 268b are individually labeled.

As shown, while main lobe 260 is completely within sector 218a, at least a portion of side lobe 262a is within sector 218b. As such, side lobe 262a may interfere with main lobe 266 of beamform 264, particularly where beamforms 250 and 264 are transmitted at substantially the same frequencies. Beamforming module 220 may select to disable beamforming to UE 226a or 226b so as to prevent interference between beamforms 250 and 264. Where beamforming is disabled to a UE, base station 218 may continue to send communications to the UE without beamforming.

In the present example, regions 242 and 244 comprise subsectors of their corresponding sectors. Regions 242 and 244 are each bounded by shared border 230a and form a continuous region between the sectors. However, in other implementations, regions 242 and 244 are not continuous. For example, one or both of regions 242 and 244 may not be defined by a sector boundary or border, and instead may terminate within a sector. Additionally, regions 242 and 244 need not be sub sectors and may have differing shapes and/or extents than what is shown. While regions 242 and 244 are depicted as having substantially identical shapes and sizes, regions 242 and 244 could be shaped and sized differently with respect to one another.

In some cases, at least one of regions 242 and 244 may substantially span positions where beamforming to a UE in the region would result in at least a portion of a beamform, such as at least a portion of a side lobe of the beamform, being within the other of the pair of regions, which could be in an adjoining, or neighboring sector, as shown. For example, in FIG. 2C, region 242 is defined such that side lobe 262a is at least partially within sector 218b substantially throughout region 242 when beamforming to UE 226a. Region 244 may be similarly defined with respect to side lobe 268b and sector 218a. The exemplary regions may terminate at positions where the side lobes would be substantially outside of the adjoining sector, or region.

Although illustrated with respect to UE 226a and UE 226b, beamforms to other UE typically have substantially similar beamforms, such that regions 242 and 244 can similarly correspond to those beamforms. Thus, when analyzing positions of UE from sectors 218a and 218b, it may be desirable to disable beamforming to at least some of the UE when at least one UE is in each of regions 242 and 244 so as to reduce or eliminate inter-sector interference in beamforming. For example, in some cases, beamforming may be disabled to all UE in either region 242 or region 244. Beamforming module 220 can make the determination of which of the UE to disable, as will later be described in additional detail.

Although not shown, similar pairs of regions including regions such as regions 242 and 244 may be employed for each adjoining pair of sectors. Thus, for example, cell 240 may include three pairs of such regions, which may optionally have similar shapes and extents as shown in FIGS. 2C and 2D. Each pair of regions may be employed by beamforming module 220 when analyzing positions of UE in the corresponding regions. In doing so, interference detector 252 may select UE as candidates for having beamforming disabled based on the UE being within those pairs of regions. For example, UE 226a and 226b may be selected as candidates based on UE 226a being in region 242 while UE 226b is in region 242 as indicated by their monitored positions. As indicated in FIG. 2B, other UE may also be in regions 242 and 244. Those UE may similarly be selected as candidates based on their monitored positions. In doing some, selections of which UE to disable may be made with respect to each pair of regions (e.g. UE in one region from each pair).

Various approaches are contemplated for interference detector 252 to determine whether a UE is within a particular region based on one or more geographic coordinates of the UE. For more complicated regions multiple geographic coordinates may be employed. However, in some cases, only one geographic coordinate may be required. For example, in some implementations, interference detector 252 may determine that UE 226a is within region 242 based only on the angle of UE 226a with respect to base station 218, or some other reference point.

As shown, region 242 can be defined by an angle corresponding to, for example, approximately 25 degrees or less, which is measured from the dashed line that bisects sector 218*a* in FIG. 2C. As region 242 is bounded by border 230*a* in the present example, interference detector 252 may determine that a UE is within region 242 based on the angle of the UE exceeding the threshold angle that defines the boundary of region 242 (e.g. where the angle is less than 25 degrees in the present example). Multiple threshold angles may be considered, for example, where region 242 is not defined by border 230*a* (e.g. where region 242 is also defined by a second threshold angle within sector 218*a*), to determine whether the position of a UE falls within the range of angles corresponding to region 242.

Region 244 may be defined by an angle corresponding to, for example, approximately −25 degrees or more, which is measured from the dashed line that bisects sector 218*b* in FIG. 2D. As region 244 is bounded by border 230*a* in the present example, interference detector 252 may determine that a UE is within region 244 based on the angle of the UE exceeding the threshold angle that defines the boundary of region 244 (e.g. where the angle is greater than −25 degrees in the present example). Multiple threshold angles may be considered, for example, where region 244 is not defined by border 230*a* (e.g. where region 244 is also defined by a second threshold angle within sector 218*b*), to determine whether the position of a UE falls within the range of angles corresponding to region 242.

Where interference detector 252 determines that at least one UE is within region 242 while at least one UE is within region 244, one to all of the UE in each of regions 242 and 244 can be identified as candidates for having beamforming to the UE disabled by beamforming selection component 254. In turn, beamforming selection component 254 can select to disable beamforming to one or more of the candidate UE. In some implementations, beamforming selection component 254 selects one or more UE to disable beamforming to based on priorities of the UE. For example, beamforming selection component 254 may select one or more UE to disable beamforming to based on those UE having lower priorities than other one or more UE.

In some implementations, beamforming selection component 254 selects to disable beamforming to one or more UE based on the UEs collectively having a lower priority than one or more other UE. In turn, beamforming selection component 254 may refrain from disabling one or more UE based on collectively having a higher priority than one or more other UE. For example, beamforming selection component 254 may determine a collective priority of each identified UE in one region, such as region 242, and determine a collective priority of each identified UE in a neighboring region, such as region 244. Beamforming selection component 254 may select to disable one to all of the UE positioned in the region having the lower collective priority, whereas beamforming selection component 254 may refrain from actively disabling all of the UE positioned in the region having the higher collective priority, or at least fewer UE than are selected for disabling in the region having the lower collective priority.

In some implementations, the priorities of the UE are determined based on service flow information corresponding to the one or more UE. For example, the priorities may be based on the number of service flows of the UE, such as a service data flow (SDF). Applications communicating with base station 218 on a UE may typically have a corresponding service flow assigned by base station 218. Thus, a movie streaming application may have one service flow and a VoIP application may have another service flow. In some cases, a collective priority comprises the total number of service flows of the one or more UE being considered by beamforming selection component 254. Thus, beamforming selection component 254 may consider the total number of service flows of each UE in a region (e.g. region 242), for example.

In addition, or instead, the priorities of the UE can be determined based on quality of service information corresponding to the one or more UE. For example, in some cases, the priorities are based on quality of service values assigned to the service flows of the UE. A quality of service value may comprise a quality of service ranking. In LTE, QCI values are suitable quality of service values. Other technologies have different constructs that are similar to QCI and are within the scope of the present disclosure. In LTE, QCI is typically ranked from 1 through 9, with 9 being the lowest priority level. As an example, Email or web browsing application may have a QCI of 9, whereas a VOID application may have a QCI of 6. A movie streaming application may have a QCI of 2, and a carrier sponsored application may have a QCI of 1, as some specific examples.

In basing priorities off of quality of service values, in some cases, beamforming selection component 254 may factor in the number of unique quality of service values assigned to the one or more UE. For example, where the one or more UE have 16 service flows all being assigned QCI 9, those one or more UE would have 1 unique QoS value. If half of the 16 service flows were assigned QCI 6 and half QCI 9, those one or more UE would have 2 unique QoS values. In addition, or instead, basing priorities off of quality of service values may factor in the highest quality of service value assigned to the one or more UE. Another suitable factor may comprise the average quality of service value for the one or more UE.

The priorities can be based on any combination of the various factors described above, and/or other priority factors. It will be appreciated that many different priority factors may be considered. Another example includes the number of UE in a region. In some implementations, one to all of the priority factors may be determined from scheduling information of base station 218. For example, beamforming selection component 254 may read from one or more scheduling assignments of one or more schedulers that includes QCI assignments, service flow assignments, and/or other quality of service assignments. The various factors can be combined into a priority score for each UE or group of UE being analyzed in terms of relative priorities. In doing so, the various factors can be assigned respective weights and can be summed to form the priority score. The weights can optionally be changed or updated over time.

Beamforming selection component 254 can compare the priority scores in order to determine whether or not to disable beamforming to UE. For example, if a priority score corresponding to the UE in region 242 is higher than a priority score corresponding to the UE in region 244, beamforming selection component 254 may select to disable beamforming to one to all of the UE in region 244. Base station 218 may then refrain from beamforming to each UE selected by beamforming selection component 254.

Base station 218 (e.g. a scheduler thereof) may not have planned to provide a beamform to a UE selected by beamforming selection component 254. However, base station 218 (e.g. a scheduler thereof) may have planned to provide beamforms to at least one UE, which does not occur based on being selected by beamforming selection component 254. Selecting to disable beamforming to all of the UE in region 244 can prevent inter-sector interference in beamforming between sectors 218a and 218b. As indicated above, similar selections may occur between other pairs of regions with respect to other pairs of sectors of cell 240. Thus, a UE may not have been selected for being disabled when considering regions 242 and 244, but may be selected for being disabled when considering another pair of regions if one of those regions overlapped region 242 or 244.

One or more UE that have previously had beamforming selected to be disabled can have beamforming no longer be selected to be disabled for a variety of reasons. As one example, beamforming selection component 254 may no longer select to disable beamforming to a UE based on the UE moving out of a region as indicated by a monitored position of the UE. For example, beamforming selection component 254 may perform another selection of UE to disable with respect to regions 242 and 244, but the UE may not be in either of those regions. Furthermore, beamforming selection component 254 may no longer select to disable beamforming to a UE based on an updated priority score corresponding to the UE. In particular, priority scores may be updated over time, such as every 30 milliseconds, every second, or at other increments so that another selection of UE to disable results in a different outcome. In some cases, priority scores may change based on one or more UE leaving and/or entering a region that corresponds to the priority score. In addition, or instead, any of the various factors that contribute to the priority score can change over time, such as quality of service information corresponding to the UE.

Furthermore, as described above, while beamforming selection component 254 may not select to disable beamforming to a UE in a first sector or region of a cell with respect to a second sector or region of a cell, beamforming selection component 254 may still select to disable beamforming to the UE with respect to a third sector or region of the cell. For example, beamforming selection component 254 may not select to disable beamforming to UE 226a in region 242 based on UE in region 242 collectively having higher priorities than UE in region 244. However, UE 226a may also be in another region having priorities being compared to priorities of a region in sector 218c. Thus, beamforming selection component 254 may still select to disable beamforming to UE 226a based on a similar comparison for sectors 218a and 218c as described above with respect to sectors 218a and 218b.

Thus, in various implementations, positions of UE can be monitored to determine whether or not the UE are located within pairs of regions of sectors that tend to result in inter-sector interference in beamforming, such as between neighboring sectors. Furthermore, priorities of UE can be employed to determine which region should have beamforming disabled to UE in the region. In doing so, beamforming may continue to be utilized to communicate with more important, or higher priority UE, while reducing or eliminating inter-sector interference in beamforming.

Figure 3:
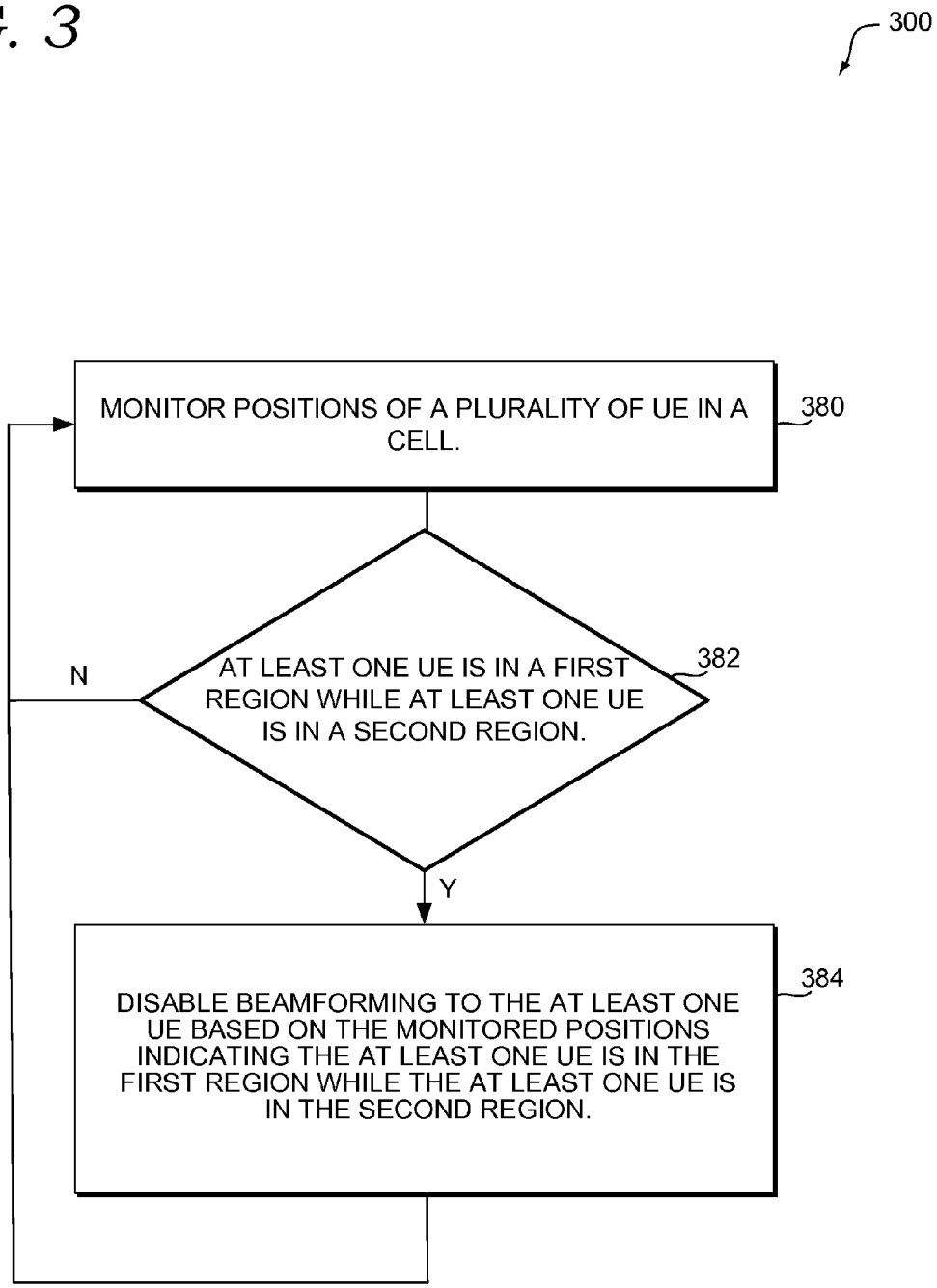
FIG. 3 depicts a flow diagram of an exemplary method for reducing interference between inter-sector beamforms in one or more wireless communications networks, in accordance with implementations of the present disclosure.

Referring now to FIG. 3, FIG. 3 depicts a flow diagram of an exemplary method 300 for reducing interference between inter-sector beamforms in one or more wireless communications networks, in accordance with implementations of the present disclosure. Method 300 is described below with respect to FIGS. 2A, 2B, 2C, 2D, and 3, for illustrative purposes only. However, method 300 is not limited to particular features of network environment 200 described herein. Furthermore, what is shown in FIG. 3 should not necessarily be considered comprehensive with respect to method 300 in that certain procedures may be omitted or additional procedures may be employed. Also, certain orderings of those procedures indicated by FIG. 3 should not be considered limiting and may be altered in certain implementations of the present disclosure.

At block 380, method 300 includes monitoring positions of UE in a cell. For example, interference detector 252 may periodically monitor positions of any to all of the UE shown in FIG. 2B. The positions of the UE may be provided to interference detector 252 by UE locator 256. UE locator 256 may periodically determine angles of the UE with respect to base station 218 based DoAs of RF communications from the UE. In doing so, a DoA for each UA may be determined, for example, from an SRS from the UE.

At block 382, method 300 includes communicating to a first plurality of the UE in a first sector of the cell using beamforming. For example, base station 218 may communicate to each of the UE shown sector 218a in FIG. 2B using beamforming. The beamform to UE 226a may correspond to beamform 250 in FIG. 2C. However, during this time base station 218 may be communicating to at least some of the UE in section 218b, shown in FIG. 2B without using beamforming based on beamforming selection component 254 having previously selected to disable beamforming to those UE.

At decision point 382, if at least one UE is in a first region of a cell while at least one UE is in a second region of the cell, method 300 may continue to block 384. Otherwise, method 300 may continue performing block 380. The first region may be in a first sector of the cell while the second region may be in a second sector of the cell. For example, interference detector 252 may select, or identify, each of the UE shown in sector 218a in FIG. 2B as candidates for having beamforming to the UE disabled based on the UE being within region 242 shown in FIG. 2C, while at least one UE is within region 244, shown in FIG. 2D. Interference detector 252 may determine that the UE are within region 242 based on their respective monitored positions indicating that they are within region 242. For example, each monitored angle may exceed, or be less than, 25 degrees.

Similarly, interference detector 252 may select, or identify, each of the UE shown in sector 218b in FIG. 2B, except for UE 226n, as candidates for having beamforming to the UE disabled based on the UE being within region 244 shown in FIG. 2D, while at least one UE is within region 242, shown in FIG. 2D. Interference detector 252 may determine that the UE are within region 244 based on their respective monitored positions indicating that they are within region 244. For example, each monitored angle may exceed, or be greater than, 25 degrees. As UE 226n is not within region 244, interference detector 252 may not select UE 226n as a candidate, at least with respect to region 244. However, UE 226n could concurrently or subsequently be selected as a candidate with respect to a region in sector 218c in a similar method as method 300 that is based on a different pair of regions amongst sectors.

At block 384, method 300 includes disabling beamforming to one or more of the first plurality of UE based on the monitored positions indicating the at least one UE is in the first region while the at least one UE is within the second region. For example, beamforming selection component 254 may select to disable beamforming to any of the various candidates identified by interference detector 252. As one example, beamforming selection component 254 may select to disable one or more of the UE in region 242 of sector 218a based on the UE in region 242 collectively having a lower priority than UE in region 244. In some implementations, beamforming selection component 254 may select to disable beamforming to the each of the UE in region 242.

A specific example of beamforming selection component 254 selecting to disable the UE in region 242 based on priorities of the UE in region 242 as compared to priorities of the UE in region 244 is now discussed for illustrative purposes. Assume that the collective priorities of the UE in a region=P, and P=(A*S)+(B*Q$_t$)+(Q$_m$−Q$_h$), where A and B are weight factors, S is the total number of service flows of the UE, Q$_t$ is the total number of unique QCI values, Q$_m$ is the maximum QCI value possible, and Q$_h$ is the highest QCI value of the UE. Let A=1, B=2, and Q$_m$=9. For region 242, S=5, Q$_t$=2, and Q$_h$=9, such that P=9. For region 244, S=3, Q$_t$=2, and Q$_h$=1, such that P=15. Thus, because 9<15, beamforming selection component 254 may select to disable beamforming to the UE in region 242. It will be appreciated that many alternative priority metrics may be suitable for method 300.

Prior to block 384, base station 218 may have previously communicated to the at least one UE in the first sector of the cell using beamforming. For example, base station 218 may have communicated to each of the UE shown sector 218*a* in FIG. 2B using beamforming (e.g. UE in region 242). The beamform to UE 226*a* may correspond to beamform 250 in FIG. 2C. However, based on block 384, base station 218 may subsequently communicate to each of the UE while refraining from beamforming. Thus, beamforms are not provided to the UE in regions 242 that might otherwise interfere with beamforms to the UE in region 242.

Also prior to block 384, base station 218 may be have communicated to at least some of the UE in section 218*b* (e.g. UE in region 244), shown in FIG. 2B, without using beamforming based on beamforming selection component 254 having previously selected to disable beamforming to those UE. For example, the UE in region 244 may have previously been selected for having beamforming disabled based on having a lower priority than the UE in region 242 during a previous iteration of method 300. However, the priorities of the UE in region 244 and/or 242 may have since changed, such that beamforming selection component 254 no longer selects to disable beamforming to the UE. This could be based on one or more UE leaving or entering regions 242 and/or 244 since the previous selection by beamforming selection component 254.

Thus, it will be appreciated that beamforming selection component 254 may select to disable beamforming to UE periodically, or iteratively, such that base station 218 refrains from beamforming to different UE over time, as positions of UE change and various factors that contribute to priorities of UE also change. Between selections, beamforming may be enabled for the UE that beamforming selection component 254 does not select for having beamforming disabled. However, as indicated earlier, selections by beamforming selection component 254 may occur in a round where method 300 may be performed for respective pairs of regions between each neighboring sector in network environment 200. Thus, the round may include three instances of method 300, one for each of three pairs of regions. As such, inter-sector interference in beamforming may be addressed for cell 240 as a whole.

Figure 4:
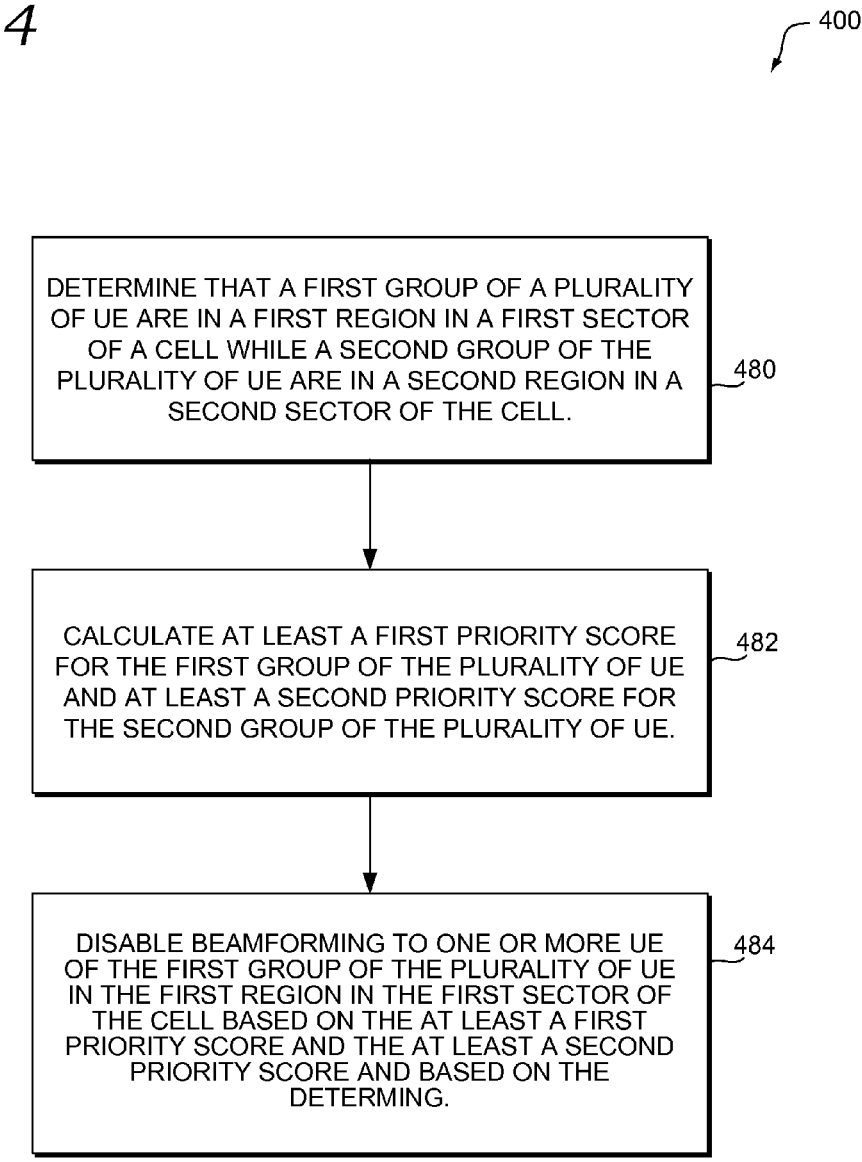
FIG. 4 depicts a flow diagram of an exemplary method for reducing interference between inter-sector beamforms in one or more wireless communications networks, in accordance with implementations of the present disclosure.

Referring now to FIG. 4, FIG. 4 depicts a flow diagram of an exemplary method 400 for reducing interference between inter-sector beamforms in one or more wireless communications networks, in accordance with implementations of the present disclosure. Method 400 is described below with respect to FIGS. 2A, 2B, 2C, 2D, and 4, for illustrative purposes only. However, method 400 is not limited to particular features of network environment 200 described herein. Furthermore, what is shown in FIG. 4 should not necessarily be considered comprehensive with respect to method 400 in that certain procedures may be omitted or additional procedures may be employed. Also, certain orderings of those procedures indicated by FIG. 4 should not be considered limiting and may be altered in certain implementations of the present disclosure.

At block 480, method 400 includes determining that a first group of a plurality of UE are in a first region in a first sector of a cell while a second group of the plurality of UE are in a second region in a second sector of the cell. For example, interference detector 252 may determine that the UE shown in sector 218*a* of cell 240 in FIG. 2B are in region 242, shown in FIG. 2C, while all of the UE shown in sector 218*b* of cell 240 in FIG. 2B are in region 244 of FIG. 2D, except for UE 226*n*. This determination may be based on monitored positions of the plurality of UE, such as has been described above with respect to method 300.

In the present example, at this time, base station 218 may be beamforming to the UE in region 242 while beamforming to the UE in region 244 is disabled. Beamforming may or may not be disabled for UE 226*n*. Beamforms from base station 218 of cell 240 to the first group in region 242 of sector 218*a* each include a side lobe at least partially within region 244 in sector 218*b* of cell 240. For example, beamform 250 is shown as having side lobe 262*a* in region 244 in FIG. 2C. The beamforms to the other UE in region 242 may look similar to beamform 250, but rotated by their angle with respect to base station 218. In some cases, if beamforming were enabled for the UE in region 244, beamforms from base station 218 of cell 240 to the second group in region 244 of sector 218*b* would each include a side lobe at least partially within region 242, such as side lobe 268*b* in FIG. 2D.

In some cases, region 242 is defined such that a beamform from base station 218 of cell 240 to a UE in region 242 would result in a side lobe of the beamform being substantially in region 244 when the UE is at substantially any angle with respect to base station 218 in region 242 (or at least when the UE is at the inner boundary within the sector). However, in these implementations, outside of region 242 in sector 218*a*, a beamform from base station 218 of cell 240 to a UE in region 242 would not result in a side lobe of the beamform being substantially in region 244 when the UE is at substantially any angle with respect to base station 218 outside of region 242. Thus, for example, when a UE is at a given distance from base station 218 within region 242, a beamform to that UE may have a side lobe in region 244 at substantially or primarily any angle with respect to base station 218. Region 244 may optionally be similarly defined with respect to region 242 (e.g. based on where a side lobe of a beam form to a UE in region 244 would be in region 242).

At block 482, method 400 includes calculating at least a first priority score for the first group of the plurality of UE and at least a second priority score for the second group of the plurality of UE. For example, interference detector 252 may calculate priority scores for one to all of the UE in region 242 and for one to all of the UE in region 244. The priority scores may optionally be calculated based on, or in response to the determining of block 480. In some cases, at least some of the factors used to calculate the priority score may be read or derived from scheduling data received from one or more schedulers. For example, factors for the at least a first priority score corresponding to UE in sector 218*a* may be from a scheduler of sector 218*a* and factors for the at least a second priority score corresponding to UE in sector 218*b* may be from a scheduler of sector 218*b*.

As indicated above, in some implementations, a single priority score is calculated that collectively corresponds to the first group of the plurality of UE (e.g. the UE in region 242). Furthermore, a single priority score may be calculated that collectively corresponds to the second group of the plurality of UE (e.g. the UE in region 244).

At block 484, method 400 includes disabling beamforming to one or more UE of the first group of the plurality of UE in the first region in the first sector of the cell based on the at least a first priority score and the at least a second priority score and based on the determining. For example, beamforming selection component 254 may select to disable beamforming to all UE in region 242 (e.g. the UE shown in FIG. 2B), based on the UE in region 242 collectively having a lower priority score than a collective priority score of the UE in region 244. The disabling may be based on, or in response to the determining of block 480. Furthermore, based on, or in response to the determining of block 480, beamforming selection component 254 may no longer select to disable beamforming to the UE in region 244.

Thus, in some implementations, beamforming selection component 254 may select between beamforming to UE in region 244 or beamforming to UE in region 242, such that only UE in one of the regions receive beamforms at a given time (e.g. the higher priority UE or region). Method 400 may be repeated periodically, although the members of the first and second groups of the plurality of UE may change over time. Furthermore, method 400 may be performed with respect to different regions than described, such as any given pair of regions. In some cases, method 400 is performed for each pair of regions before performing method 400 again for a given pair of regions.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for reducing interference between inter-sector beamforms in one or more wireless communications networks, the method comprising:
communicating to a plurality of user equipment (UE) in a cell using beamforming, the plurality of UE comprising a first group of UE in a first sector of the cell and a second group of UE in a second sector of the cell;
monitoring positions of the plurality of UE in the cell;
determining that at least one UE of the first group of UE is in a first region of the first sector, the at least one UE being in the first region indicating that a beamform corresponding to the at least one UE has a potential of interfering with one or more other beamforms corresponding to the second group of UE in the second sector of the cell;
based on the at least one UE of the first group of UE being in the first region of the first sector, disabling the beamforming to the at least one UE of the first group of UE.

2. The one or more computer-readable media of claim 1, wherein the monitored positions are monitored angles of the plurality of UE.

3. The one or more computer-readable media of claim 1, wherein the disabling comprises determining that the first group of UE are in the first region in the first sector of the cell based on respective angles of the UE in the first group of UE each exceeding a first threshold angle.

4. The one or more computer-readable media of claim 1, wherein the disabling comprises determining that the second group of UE are in a second region in the second sector of the cell based on respective angles of the UE in the second group of UE each exceeding a second threshold angle.

5. The one or more computer-readable media of claim 1, further comprising no longer disabling beamforming to the at least one UE of the first group of UE based on the at least one UE of the first group of UE no longer being in the first region in the first sector of the cell.

6. The one or more computer-readable media of claim 1, wherein in the first and second sectors are neighboring sectors of the cell.

7. The one or more computer-readable media of claim 1, wherein the disabling comprises selecting to disable beamforming to the at least one UE of the first group of UE based on a comparison between a priority score associated with the at least one UE of the first group of UE and a priority score associated with at least one UE of the second group of UE.

8. The one or more computer-readable media of claim 1, wherein the disabling comprises selecting to disable beamforming to the at least one UE of the first group of UE based on quality of service information corresponding to the at least one UE of the first group of UE.

9. A method for reducing interference between inter-sector beamforms in one or more wireless communications networks, the method comprising:
determining, based on positions of a plurality of UE in a cell, that a first group of the plurality of UE is in a first region in a first sector of the cell while a second group of the plurality of UE is in a second region in a second sector of the cell, wherein beamforms from a base station of the cell to the first group of the plurality of UE each include a side lobe at least partially within the second region in the second sector of the cell, indicating a potential for interference between the beamforms corresponding to the first group of the plurality of UE and beamforms corresponding to the second group of the plurality of UE;
calculating a first priority score for the first group of the plurality of UE and a second priority score for the second group of the plurality of UE; and
disabling beamforming to one or more UE of the first group of the plurality of UE based on the first priority score and the second priority score and based on the first group of the plurality of UE being in the first region while the second group of the plurality of UE is in the second region.

10. The method of claim 9, wherein the first priority score is a collective priority score of the first group of the plurality of UE.

11. The method of claim 9, wherein the disabling the beamforming is based on a comparison between the first priority score and the second priority score.

12. The method of claim 9, further comprising:
disabling beamforming to one or more of the second group of UE;

no longer disabling beamforming to the second group of UE based on the first priority score and the second priority score.

13. The method of claim 9, wherein the positions are angles of the plurality of UE.

14. The method of claim 9, wherein the determining is based on angles of each of the first group of UE exceeding a first threshold angle while angles of each of the second group of UE exceed a second threshold angle.

15. The method of claim 9, further comprising no longer disabling beamforming to at least one UE in the first group of the plurality of UE based on the first UE no longer being in the first region in the first sector of the cell.

16. A beamforming system for reducing interference between inter-sector beamforms in one or more wireless communications networks, the beamforming system comprising:
- an interference detector that determines that a first user equipment (UE) is located in a first region in a first sector of a cell while a second UE is located in a second region of a second sector of the cell, the first UE being located in the first region while the second UE is located in the second region indicating that a beamform corresponding to the first UE has a potential of interfering with a beamform corresponding to the second UE in the second sector of the cell;
- a beamforming selection component that selects to disable beamforming to the first UE based on the determining that the first UE is located in the first region in the first sector of the cell while the second UE is located in the second region of the second sector of the cell.

17. The beamforming system of claim 16, wherein the interference detector further determines that a third UE is located in a third region in the first sector of the cell while a fourth UE is located in a fourth region of a third sector of the cell, the third UE being located in the third region while the fourth UE is located in the fourth region indicating that a beamform corresponding to the third UE has a potential of interfering with a beamform corresponding to the fourth UE in the third sector of the cell; and
- wherein the beamforming selection component further selects to disable beamforming to the third UE based on the determining that the third UE is located in the third region in the first sector of the cell while the fourth UE is located in the fourth region of the third sector of the cell.

18. The beamforming system of claim 16, further comprising a base station communicating to the first UE without beamforming based on the selecting to disable beamforming to the first UE by the beamforming selection component.

19. The beamforming system of claim 16, further comprising the beamforming selection component no longer selecting to disable beamforming to the first UE based on the first UE no longer being located in the first region in the first sector of the cell.

20. The beamforming system of claim 16, further comprising a UE locator determining a position of the first UE in the cell based on an radio frequency (RF) communication between the first UE and a base station of the cell.

* * * * *